US 8,455,603 B2
Jun. 4, 2013

(12) United States Patent
Ferenz et al.

(10) Patent No.: US 8,455,603 B2
(45) Date of Patent: Jun. 4, 2013

(54) PROCESS FOR THE PREPARATION OF AMINE-AMIDE-FUNCTIONAL SILOXANES

(75) Inventors: Michael Ferenz, Essen (DE); Christian Mund, Essen (DE); Wilfried Knott, Essen (DE); Stefan Silber, Krefeld (DE)

(73) Assignee: Evonik Goldschmidt GmbH, Essen (DE)

( * ) Notice: Subject to any disclaimer, the term of this patent is extended or adjusted under 35 U.S.C. 154(b) by 58 days.

(21) Appl. No.: 13/031,317

(22) Filed: Feb. 21, 2011

(65) Prior Publication Data
US 2011/0230633 A1 Sep. 22, 2011

(30) Foreign Application Priority Data

Feb. 22, 2010 (DE) .................. 10 2010 002 178

(51) Int. Cl.
*C08G 77/26* (2006.01)
(52) U.S. Cl.
USPC .............................................. 528/26; 528/34
(58) Field of Classification Search
None
See application file for complete search history.

(56) References Cited

U.S. PATENT DOCUMENTS

| | | | |
|---|---|---|---|
| 5,302,659 A * | 4/1994 | Bindl et al. ................ 524/838 |
| 5,401,871 A | 3/1995 | Feldmann-Krane et al. |
| 5,430,166 A | 7/1995 | Klein et al. |
| 5,714,524 A * | 2/1998 | Hara et al. ................... 522/99 |
| 5,804,099 A | 9/1998 | Wernfried et al. |
| 6,054,534 A | 4/2000 | Josten et al. |
| 6,248,855 B1 | 6/2001 | Dalle et al. |
| 6,255,429 B1 * | 7/2001 | Griffin et al. ................ 528/25 |
| 6,291,622 B1 | 9/2001 | Droese et al. |
| 6,420,324 B1 | 7/2002 | Ebbrecht et al. |
| 6,423,785 B1 | 7/2002 | Esselborn et al. |
| 6,552,092 B2 | 4/2003 | Ebbrecht et al. |
| 6,858,663 B2 | 2/2005 | Knott et al. |
| 6,861,493 B2 | 3/2005 | Bauer et al. |
| 7,157,541 B2 | 1/2007 | Knott et al. |
| 7,189,772 B2 | 3/2007 | Bauer et al. |
| 7,399,348 B2 | 7/2008 | Blanda et al. |
| 7,754,778 B2 | 7/2010 | Knott et al. |
| 7,759,402 B2 | 7/2010 | Venzmer et al. |
| 7,825,206 B2 | 11/2010 | Neumann et al. |
| 7,829,647 B2 | 11/2010 | Bruckner et al. |
| 7,834,122 B2 | 11/2010 | Ferenz et al. |
| 2008/0076842 A1 | 3/2008 | Ferenz et al. |
| 2008/0305065 A1 | 12/2008 | Ferenz et al. |
| 2009/0062459 A1 | 3/2009 | Thum et al. |
| 2009/0137751 A1 | 5/2009 | Knott et al. |
| 2009/0137752 A1 | 5/2009 | Knott et al. |
| 2010/0031852 A1 | 2/2010 | Herrwerth et al. |
| 2010/0034756 A1 | 2/2010 | Herrwerth et al. |
| 2010/0056818 A1 | 3/2010 | Ferenz et al. |
| 2010/0071849 A1 | 3/2010 | Knott et al. |
| 2010/0266651 A1 | 10/2010 | Czech et al. |

FOREIGN PATENT DOCUMENTS

WO WO 2009/138305 11/2009
WO WO 2009/138306 11/2009

OTHER PUBLICATIONS

International Search Report for EP 11151628 dated Jul. 12, 2011.

* cited by examiner

*Primary Examiner* — Marc Zimmer
(74) *Attorney, Agent, or Firm* — Frommer Lawrence & Haug LLP

(57) ABSTRACT

The invention describes amine-amide-functional siloxanes and a process for the preparation thereof by the chemical reaction of SiOH-functional siloxanes with amino-functional silanes in the presence of carboxylic acid anhydrides.

16 Claims, No Drawings

PROCESS FOR THE PREPARATION OF AMINE-AMIDE-FUNCTIONAL SILOXANES

Any foregoing applications, including German patent application DE 10 2010 002178.4, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

STATE OF THE ART

Siloxanes which are substituted with amine functions are often used in the textile industry as fibre lubricants, laundry softeners or as anticrease aids. Furthermore, they are used widely in personal care applications, for example as conditioners for hair.

By contrast, siloxanes in which amide functions are also additionally linked to the siloxane backbone as well as amine functions do not receive attention in the patent literature although compounds of this type have a particular profile of properties as a result of the insertion of the amide function. For example, the insertion of the amide functions leads to considerably increased viscosities, which supposedly heavily influences the properties for many applications.

The fact that compounds of this type are not used may lie in the fact that the preparation of mixed amine- and amide-functional siloxanes is more complex since the amide function first has to be inserted into the polymer by means of a subsequent reaction if pure aminosiloxanes are used as starting materials.

Preparation methods for pure aminosiloxanes are described in the patent literature.

For example, U.S. Pat. No. 4,633,002 describes a process for the preparation of aminosiloxanes in which silanol-terminated siloxanes are reacted with amino-functional silanes in the presence of organometallic catalysts.

U.S. Pat. No. 5,391,675 describes a process for the preparation of aminosiloxanes in which terminally silanol-functional polysiloxanes, amine-functional silanes, and a catalyst system, which consists of barium hydroxide or strontium hydroxide and also sodium borate or sodium phosphate, are reacted.

U.S. Pat. No. 7,238,768 describes amino-functional siloxanes which are prepared by reacting amine-functional silanes with carboxylic acids and silanol-functional polysiloxanes. The reaction described therein produces aminosiloxanes which are provided at the chain ends with condensable groups. These are either OH functions or alkoxy radicals having 8 to 30 carbon atoms. No amide functions are formed under the reaction conditions described therein.

WO 2009/06564 (US Publ. 2008-004748) describes siloxanes which, besides hydrophobic and hydrophilic organic radicals, can also have an amide function. These structures are prepared by means of hydrosilylation.

WO 2009/025151 (US Publ. 2010-137547) describes siloxanes containing amide groups which are suitable as component for polybenzoimidazole and polybenzoxazole resins.

WO 2004/072152 (U.S. Pat. No. 6,838,541) describes a method for the preparation of siloxane-based polyamides, in which an organic amide is reacted with a hydride-functional polysiloxane in the presence of a catalyst which promotes the hydrosilylation.

Citation or identification of any document in this application is not an admission that such document is available as prior art to the present invention.

DESCRIPTION OF THE INVENTION

The object of the invention is to provide novel compounds which combine the property profiles of the amine- and the amide-function-carrying siloxanes with one another in a positive way.

Siloxanes were found which, besides amine functions, also additionally have amide functions and are therefore characterized by a particular profile of properties.

The invention therefore provides a process which permits the simple and rapid synthesis of mixed amine-amide-functional siloxanes, and also the mixed amine-amide-functional siloxanes prepared in this way.

For example, the insertion of the amide functions leads to a higher viscosity compared to pure aminosiloxanes. The absorption capacity to surfaces also changes considerably, meaning that the application properties differ from those of pure aminosiloxanes.

Within the context of this invention, amine-amide-functional siloxanes are understood as meaning siloxanes which are modified both with amine functions and also with amide functions and, if desired, further organic radicals.

To prepare the amine-amide-functional siloxanes, SiOH-functional siloxanes of the general formula I are reacted with amino-functional silanes of the general formula II in the presence of carboxylic acid anhydrides and optionally in the presence of alcohols, amines and/or alkanolamines at temperatures of 40-180° C.

A suitable process for the synthesis consists in reacting SiOH-functional siloxanes of the general formula I with amino-functional silanes of the general formula II and carboxylic acid anhydrides and optionally alcohols, amines and/or alkanolamines.

$$M^{OH}{}_a D_b T_c Q_d \qquad \text{Formula I}$$

where:
$M^{OH}=[HO-SiR^1{}_2O_{1/2}]$
$D=[SiR^1{}_2O_{2/2}]$
$T=[SiR^1O_{3/2}]$
$Q=[SiO_{4/2}]$
a=2-10, preferably 2-4, in particular 2,
b=5-150, preferably 8-80, in particular 10-60,
c=0-10, preferably 0-3, in particular 0
d=0-10, preferably 0-3, in particular 0
$R^1$=identical or different radicals from the group: alkyl radicals having 1-30 carbon atoms, aryl radicals having 6-30 carbon atoms, alkaryl radicals having 7-30 carbon atoms, preferably methyl, ethyl or phenyl radicals, in particular methyl radical.

$$R^1{}_e(R^2O)_f SiR^3 \qquad \text{Formula II}$$

where:
e=0, 1 or 2, preferably 0 or 1, in particular 1,
f=1, 2 or 3, preferably 2 or 3, in particular 2,
with the proviso that e+f=3,
$R^2$=identical or different alkyl radicals having 1-30 carbon atoms, or aryl radicals having 6-30 carbon atoms, or alkaryl radicals having 7-30 carbon atoms, preferably methyl, ethyl or phenyl radicals, in particular methyl or ethyl, $R^3$=identical or different organic radicals which carry at least one amino function, in particular identical or different radicals of the general formula III $$—(CR^4{}_2)_g[NR^5—(CR^4{}_2)_i]_hNR^5{}_2 \qquad \text{Formula III}$$

g=identical or different integers from 1-6, preferably 1-3, in particular 1 or 3,
h=identical or different integers from 0-6, preferably 0-3, in particular 0 or 1,
i=identical or different integers from 1-6, preferably 1-3, in particular 2 or 3.
$R^4$=identical or different alkyl radicals having 1-12 carbon atoms, or aryl radicals having 6-12 carbon atoms or alkaryl radicals having 7-12 carbon atoms or H, preferably methyl or H, in particular H,
$R^5$=identical or different alkyl radicals having 1-12 carbon atoms, or aryl radicals having 6-12 carbon atoms or alkaryl radicals having 7-12 carbon atoms or H, preferably methyl, phenyl, benzyl or H, in particular H.

The SiOH-functional siloxanes, but also the products formed by the reaction are polymers with a certain molecular weight distribution. Consequently, the stated indices a, b, c and d are only average values.

Examples of preferred amino-functional silanes are: $(EtO)_3Si(CH_2)_3NH_2$, $(MeO)_3Si(CH_2)_3NH_2Me(EtO)_2Si$ $(CH_2)_3NH_2$, $Me(MeO)_2Si(CH_2)_3NH_2(EtO)_3Si(CH_2)_3NH$ $(CH_2)_2NH_2$, $(MeO)_3Si(CH_2)_3NH(CH_2)_2NH_2Me(EtO)_2Si$ $(CH_2)_3NH(CH_2)_2NH_2$, $Me(MeO)_2Si(CH_2)_3NH(CH_2)_2NH_2$ $(EtO)_3SiCH_2NH_2$, $(MeO)_3SiCH_2NH_2$.

Suitable carboxylic acid anhydrides are inter alia anhydrides of linear or branched, saturated or unsaturated alkylcarboxylic acids, such as, for example, acetic anhydride, propionic anhydride, butyric anhydride or isononanoic anhydride. Cyclic anhydrides, such as, for example, succinic anhydride, itaconic anhydrides, maleic anhydride, glutaric anhydride, phthalic anhydride or hexahydrophthalic anhydride are also suitable.

In particular one or more mono- or polyfunctional alcohols, primary or secondary amines or else aminoalkanols are suitable as optional component.

In the reaction, the carboxylic acid anhydrides form amide functions with the amino groups which are introduced via the amino-functional silanes. Furthermore, free carboxylic acids are formed. By way of example, this reaction is shown schematically in formula scheme 1 using acetic anhydride and a propylamino radical.

Formula Scheme 1

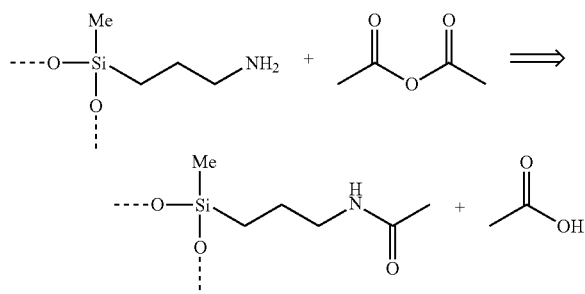

Furthermore, during the reaction, condensation reactions take place in which the alkoxy functions of the silane of the general formula II react with the SiOH functions of the SiOH-functional siloxane of the general formula I. This can be seen for example from the fact that alcohols are formed during the reaction. By way of example, this reaction is shown schematically in formula scheme 2. The optionally used mono- or polyfunctional alcohols, primary or secondary amines or else aminoalkanols can also react with condensation with the silanol or the silane, with elimination of water or alcohol.

Formula Scheme 2

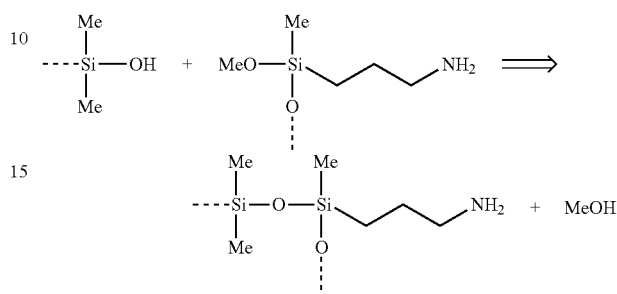

Besides these reactions, further reactions can also take place, such as, for example, the condensation of two SiOH functions with the formation of water.

As a result of condensation reactions, the amine and the amide functions are incorporated into the siloxane backbone. It is also possible to subsequently amidate amino functions already incorporated into the siloxane backbone. Siloxanes are formed which have both amine and also amide functions and have a higher average molecular weight than the siloxanes of the general formula I used.

The molecular weight increase can also be seen from the increase in the viscosity of the reaction mixture.

If required, as well as the amino-functional siloxanes of the general formula II, it is possible to add further di- or tri- or tetraalkoxysilanes to the reaction mixture, for example in order to incorporate further organic functions into the polymer that is formed or in order to integrate branches into the polymer backbone. Suitable alkoxysiloxanes are, for example, tetraethoxysilane, triethoxysilane, trimethoxysilane, triethoxyoctylsilane, phenyltriethoxysilane, isobutyltrimethoxysilane, 3-mercaptopropyltrimethoxysilane, 3-ureidopropyltri-ethoxysilane, hexadecyltrimethoxysilane or polyethylene glycol-functional alkoxysilane.

During the condensation, compositions are formed which primarily contain amine-amide-functional siloxanes. This invention therefore further provides compositions obtainable by the process according to the invention, containing amide-amine siloxanes of the general formula IV.

$$M^{OR}{}_jM_kD_lT_mQ_nM'_oD'_pT'_q \qquad \text{Formula IV}$$

Here, D, T and Q are as defined above.
$M^{OR}=[R^6OSiR^1{}_2O_{1/2}]$
$M=[R^1{}_3SiO_{1/2}]$
$M'=[R^7SiR^1{}_2O_{1/2}]$
$D'=[SiR^1R^7O_{2/2}]$
$T'=[SiR^7O_{3/2}]$
$R^6=R^2$ or H
$R^7$=identical or different organic radicals, with the proviso that each molecule of the formula IV, in statistical terms, carries at least one amine radical of the general formula III and moreover at least one amide radical of the general formula V, $$—(CR^4{}_2)_g[NR^5—(CR^4{}_2)_i]_hNR^5{}_2 \qquad \text{Formula III}$$

$$—(CR^5{}_2)_g[NR^8—(CR^5{}_2)_i]_hNR^8{}_2 \qquad \text{Formula V}$$

$R^8=R^5$ or a carboxylate group, with the proviso that at least one of the two $R^8$ radicals in the formula V is a carboxylate radical,
j=0-10,
k=0-10,
with the proviso that j+k is greater than or equal to 2,
l=10-3000, preferably 16-2000, in particular 20-800,
m=0-20, preferably 0-6 in particular 0,
n=0-20, preferably 0-6 in particular 0,
o=0-10,
p=0-20, preferably 1-15 in particular 2-10,
q=0-20, preferably 1-15 in particular 2-10, and with the proviso that o+p is greater than or equal to 2.

The advantage of this method consists in particular in that the product is formed in one synthesis step, and an amine-functional siloxane does not first have to be prepared which is then subsequently amidated.

The reaction time here depends on the choice of reaction temperature, but also on the desired degree of conversion.

It may be sensible to carry out the reaction at times or completely under reduced pressure, for example in order to remove volatile reaction products or reaction by-products or solvent fractions. Preference is given to working at least at times at pressures of less than 500 mbar, in particular at least at times at pressures of less than 300 mbar.

If desired, it is useful to alter the pressure one or more times during the reaction and to run through a pressure profile. Thus, for example, during the reaction an alcohol is formed which can be removed from the reaction mixture more easily at reduced pressure. However, distillative removal can result in severe foaming of the reaction mixture. Here, if desired, it is useful not to select too low a pressure since otherwise, in the case of a discontinuous reaction procedure, over-foaming of the reaction mass from the reactor may result.

The reaction of the starting materials takes place at 40-180° C., preferably at 50-140° C., in particular at 60-120° C. If desired, it is useful to vary the temperature during the reaction phase, for example a temperature profile can be run as a function of time or as a function of conversion.

In some instances, it is useful to preheat the starting materials and to meter them into the reactor at a certain temperature.

If desired, it is useful to meter in the starting materials in a certain order and to react different reactants firstly on their own.

If desired, it may be useful to carry out the reaction in the presence of a solvent. By means of a solvent, it may be possible to influence the reaction kinetics. Furthermore, the use of a solvent may be useful in order to influence the viscosity of the reaction mixture in a targeted manner. Suitable solvents are, for example: toluene, xylene, polyether or for example carbonates, such as diethylhexyl carbonate. The solvent can remain in the product or be removed again by distillation.

For the preparation of amide-amine siloxanes by the method described here, continuous or semicontinuous processes are also suitable. For example, the reaction can also be carried out in a cascade of stirred-tank reactors or in a flow tube (flow-reactor).

Besides the carboxylic acid anhydrides, it is also possible to add further free carboxylic acids in order to catalyse the reaction.

In the reaction of SiOH-functional siloxanes of the formula I and amino-functional silanes of the formula II in the presence of carboxylic acid anhydrides, amide-amine siloxanes are formed, the polymer backbone of which is provided with terminal condensable groups. Condensable groups here are alkoxy or OH functions bonded to the silicon atom. If required, it may be useful to convert these completely or partially into groups that are no longer condensable. One option of achieving this is to convert them to trialkylsilyl groups (silylation), for example through the targeted addition of monofunctional trialkylalkoxysilanes, such as for example trimethyl-ethoxysilane or trimethylmethoxysilane or through the addition of bis(trialkylsilyl)amines, such as, for example, bis(trimethylsilyl)amine. The addition of the silylating agent can take place before, during or after the reaction of the SiOH-functional siloxane with the amino-functional silanes in the presence of the carboxylic acid anhydrides.

This invention therefore further provides a process for the preparation of amide-amine-functional siloxanes, in which SiOH-functional siloxanes of the general formula I are reacted with amino-functional silanes of the general formula II and trialkylalkoxysilanes of the general formula VI or bis(trialkylsilyl)amines of the general formula VII in the presence of carboxylic acid anhydrides at temperatures of 40-180° C.,

$R^9_3Si(OR^2)$ Formula VI

$(R^9_3Si)_2NR^5$ Formula VII or where
$R^5$=an alkyl radical having 1-12 carbon atoms, or an aryl radical having 6-12 carbon atoms or an alkaryl radical having 7-12 carbon atoms or H, preferably methyl, phenyl, benzyl or H, in particular H, and
$R^9$=identical or different alkyl radicals having 1 to 30 carbon atoms, preferably alkyl radicals having 1-8 carbon atoms, in particular methyl or ethyl.

If desired, it may be useful to add water to the reaction mixture, for example in order to facilitate and/or to increase the rate of the hydrolysis of the alkoxy functions on the silicon.

The amount of alkoxysilane based on the SiOH-functional siloxane is variable and can be adjusted depending on the desired degree of modification. If the alkoxy functions are used in excess based on the SiOH-functions used, then it is to be expected that residual alkoxy functions will remain in the product and terminate the polymer at the chain ends.

If the OH functions are used in excess, then it is found that, depending on the reaction conditions chosen, these are able to further condense with one another to form water. The molecular weight of the prepared polymer then depends considerably on the reaction conditions chosen.

If, as described above, the process involves using a silylating agent, then the molecular weight of the resulting product can be adjusted in a targeted manner.

The amount of carboxylic acid anhydride is used in deficit based on the amount of amine used. In the process according to the invention, the quantitative ratio of amino-functional silane/carboxylic acid anhydride is from 1/0.9 to 1/0.02, preferably from 1/0.8 to 1/0.04, in particular from 1/0.6 to 1/0.06.

This invention further provides the reaction of SiOH-functional siloxanes of the general formula I with amino-functional silanes of the general formula II and one or more mono- or polyfunctional alcohols and, if desired, trialkylalkoxysilanes or bis(trialkylsilyl)amines in the presence of carboxylic acid anhydrides at temperatures of 40-180° C.

Here, the alcohol reacts in a condensation reaction with the SiOH-functional siloxanes or the amino-functional silanes to form SiOC bonds. Through the targeted addition of alcohols, it is possible to adjust the properties of the amine-amide siloxane in a targeted matter.

Particularly suitable alcohols are fatty alcohols and polyethers.

Suitable polyethers can be obtained through the addition reaction of monomers onto a starter, which is preferably an alcohol, an amine, an alkanolamine, water or ammonia. Starters may be e.g. methanol, ethanol, 1-butanol, bisphenol-A, 2-aminoethanol, ethylene glycol, propylene glycol, glycerol, oligo- and polyglycerols, 1,3-dihydroxypropane, 1,4-dihydroxybutane, 1,6-dihydroxy-hexane, 1,2,4-trihydroxybutane, 1,2,6-trihydroxyhexane, 1,1,1-trimethylolpropane, pentaerythritol, oligomers of pentaerythritol, polycaprolactone, xylitol, arabitol, sorbitol, mannitol, ethylenediamine, 1,2,3,4-tetra-hydroxybutane, castor oil or fructose.

Suitable monomers are, for example, ethylene oxide, propylene oxide, and also compounds selected from the group comprising tetrahydrofuran, 1,2-epoxybutane (n-butylene oxide), 2,3-epoxybutane (isobutylene oxide), and also dodecyl oxide. Here, the distribution of the monomers can be selected arbitrarily, such that, for example, blocks may be present. Moreover, it is also possible to use a mixture of the monomers, such that polyethers are obtained in which the units are present in statistical distribution or are gradually distributed. Such polyethers can be arranged randomly or have a block structure.

By adding monofunctional alcohols to the reaction of SiOH-functional siloxanes of the general formula I with amino-functional silanes of the general formula II and, if desired, trialkylalkoxysilanes or bis(trialkylsilyl)-amines in the presence of carboxylic acid anhydrides, it is possible, for example, to adjust the molecular weight of the condensation products in a targeted manner since monofunctional alcohols form chain ends. Difunctional alcohols, on the other hand, form, upon complete incorporation by condensation, a linear segment in the polymer backbone. Alcohols with an even higher functionality lead to branches in the polymer backbone. Moreover, the hydrophilic or hydrophobic properties of the resulting amino-functional polymer are influenced to a substantial degree.

Further suitable alcohols are, for example, fatty-acid-modified alcohols. These are di- or polyhydric alcohols in which the OH functions are partially esterified.

Further suitable compounds which carry at least one OH function are, for example, fluorinated alcohols such as $C_6F_{13}$—$CH_2CH_2OH$, or polyhydric alcohols, such as 1,2-propanediol, 1,6-hexanediol, poly(ethylene-co-1,2-butylene) diol, poly(hexamethylene carbonate)diol, glucose, fructose, polyglycerol, polyester monools or polyesterdiols, such as poly(caprolactone)diol or poly-(hexamethylene phthalate) diol or fluorinated polyethers. Moreover, alcohol amines, such as, for example, diethanolamine or ethanolamine, are suitable. Here too, the OH and/or the amine functions can be present in partially esterified and/or amidated form.

Further subject matters of the invention arise from the claims, the disclosure of which in its entirety forms part of this description.

PREPARATION EXAMPLES

In the examples listed below, the present invention is described to illustrate the invention without any intention to limit the invention, the scope of application of which arises from the entire description and the claims, to the embodiments specified in the examples. Where ranges, general formulae or compound classes are stated in this description and the examples, these are intended to encompass not only the corresponding ranges or groups of compounds that are explicitly mentioned, but also all part ranges and part groups of compounds which can be obtained by removing individual values (ranges) or compounds. If documents are cited within the context of the present description, then their content, in its entirety, is to form part of the disclosure of the present invention. If, within the context of the present invention, compounds such as e.g. amine-amide-functional siloxanes, are described which can have the various monomer units in plurality, then these can occur in random distribution (random oligomer) or arranged (block oligomer) in these compounds. Data regarding the number of units in such compounds are to be understood as meaning statistical average values, averaged over all of the corresponding compounds.

The invention is further described by the following non-limiting examples which further illustrate the invention, and are not intended, nor should they be interpreted to, limit the scope of the invention.

The viscosity of the products was measured using a viscometer of make Brookfield Viscometer model DV-I+.

Example 1

In a 250 ml three-neck flask fitted with precision-ground glass stirrer and thermometer, 191 g of a siloxane with the general formula $[HOSiMe_2O_{1/2}]_2[SiMe_2O_{2/2}]_{38}$ and 7.4 g of an amino-functional silane of the formula $Me(EtO)_2Si(CH_2)_3NH_2$ were mixed, and 1.3 g of acetic anhydride were added. The mixture was heated to 90° C. and stirred for 3 h at 100 mbar. Distillate that was formed was removed from the reaction mixture. An amide-amine-functional siloxane with a viscosity of 4500 mPa s was obtained.

Comparative Example 1

In a 250 ml three-neck flask with precision-ground glass stirrer and thermometer, 191 g of a siloxane with the general formula $[HOSiMe_2O_{1/2}]_2[SiMe_2O_{2/2}]_{38}$ and 7.4 g of an amino-functional silane of the formula $Me(EtO)_2Si(CH_2)_3NH_2$ were mixed, and 1.3 g of acetic acid were added. The mixture was heated to 90° C. and stirred for 3 h at 100 mbar. Distillate that was formed was removed from the reaction mixture. An amine-functional siloxane with a viscosity of 1100 mPa s was obtained.

Example 2

In a 250 ml three-neck flask with precision-ground glass stirrer and thermometer, 189 g of a siloxane with the general formula $[HOSiMe_2O_{1/2}]_2[SiMe_2O_{2/2}]_{38}$, 7.3 g of an amino-functional silane of the formula $Me(EtO)_2Si(CH_2)_3NH_2$ and 3.0 g of trimethylethoxysilane were mixed, and 1.3 g of acetic anhydride were added. The mixture was heated to 90° C. and stirred for 3 h at 100 mbar. Distillate that was formed was removed from the reaction mixture. An amide-amine-functional siloxane with a viscosity of 2600 mPa s was obtained. $^{29}$Si-NMR-spectroscopic investigations reveal that 53% of the chain end groups of the resulting polymer are trimethylsilyl groups.

Example 3

In a 250 ml three-neck flask with precision-ground glass stirrer and thermometer, 189 g of a siloxane with the general formula $[HOSiMe_2O_{1/2}]_2[SiMe_2O_{2/2}]_{38}$, 7.3 g of an amino-functional silane of the formula $Me(EtO)_2Si(CH_2)_3NH_2$ and 2.0 g of bis(trimethylsilyl)amine were mixed, and 1.3 g of acetic anhydride were added. The mixture was heated to 90° C. and stirred for 3 h at 100 mbar. Distillate that was formed was removed from the reaction mixture. An amide-amine-functional siloxane with a viscosity of 2100 mPa s was obtained. $^{29}$Si-NMR-spectroscopic investigations reveal that 61% of the chain end groups of the resulting polymer are trimethylsilyl groups.

Example 4

In a 250 ml three-neck flask with precision-ground glass stirrer and thermometer, 191 g of a siloxane with the general formula [HOSiMe$_2$O$_{1/2}$]$_2$[SiMe$_2$O$_{2/2}$]$_{38}$, 4.0 g of an amino-functional silane of the formula Me(EtO)$_2$Si(CH$_2$)$_3$NH(CH$_2$)$_2$NH$_2$ and 4.1 g of trimethylethoxy-silane were mixed, and 1.0 g of acetic anhydride was added. The mixture was heated to 90° C. and stirred for 1 h at atmospheric pressure and for a further 3 h at 100 mbar. Distillate that was formed was removed from the reaction mixture. An amide-amine-functional siloxane with a viscosity of 10 500 mPa s was obtained. $^{29}$Si-NMR-spectroscopic investigations reveal that 55% of the chain end groups of the resulting polymer are trimethylsilyl groups.

Example 5

In a 250 ml three-neck flask with precision-ground glass stirrer and thermometer, 164 g of a siloxane with the general formula [HOSiMe$_2$O$_{1/2}$]$_2$[SiMe$_2$O$_{2/2}$]$_{12}$, 10.4 g of an amino-functional silane of the formula Me(EtO)$_2$Si(CH$_2$)$_3$NH$_2$, 15 g of triethoxyoctylsilane and 8.6 g of trimethylethoxysilane were mixed, and 1.8 g of acetic anhydride were added. The mixture was heated to 80° C. and stirred for 3 h at 100 mbar. Distillate which was formed was removed from the reaction mixture. An amide-amine-functional siloxane with a viscosity of 25 000 mPa s was obtained. $^{29}$Si-NMR-spectroscopic investigations reveal that 58% of the chain end groups of the resulting polymer are trimethylsilyl groups.

Example 6

In a 250 ml three-neck flask with precision-ground glass stirrer and thermometer, 189 g of a siloxane with the general formula [HOSiMe$_2$O$_{1/2}$]$_2$[SiMe$_2$O$_{2/2}$]$_{38}$, and 3.0 g of trimethylethoxysilane were mixed, and 1.3 g of acetic anhydride was added. The reaction mixture was stirred for 2 h. 7.3 g of an amino-functional silane of the formula Me(EtO)$_2$Si(CH$_2$)$_3$NH$_2$ were then added. The mixture was heated to 100° C. and stirred for 3 h at 200 mbar. Distillate which was formed was removed from the reaction mixture. An amide-amine-functional siloxane with a viscosity of 2300 mPa s was obtained.

Example 7

In a 250 ml three-neck flask with precision-ground glass stirrer and thermometer, 192 g of a siloxane with the general formula [HOSiMe$_2$O$_{1/2}$]$_2$[SiMe$_2$O$_{2/2}$]$_{38}$, and 1.5 g of bis(trimethylsilyl)amine were mixed, and 2.5 g of acetic anhydride were added. The reaction mixture was stirred for 2 h. 4.9 g of an amino-functional silane of the formula Me(EtO)$_2$Si(CH$_2$)$_3$NH$_2$ were then added. The mixture was heated to 100° C. and stirred for 3 h at 200 mbar. Distillate which was formed was removed from the reaction mixture. An amide-amine-functional siloxane with a viscosity of 3500 mPa s was obtained.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:
1. A process for the preparation of amine-amide-functional siloxanes, comprising:
    reacting SiOH-functional siloxanes of the general formula I with amino-functional silanes of the general formula II in the presence of carboxylic acid anhydrides and optionally in the presence of alcohols, amines, and/or alkanolamines at temperatures of 40-180° C.;
wherein the formula I is represented by:

$$M^{OH}{}_a D_b T_c Q_d \qquad \text{Formula I;}$$

where:
    $M^{OH}$=[HO—SiR$^1$$_2$O$_{1/2}$];
    D=[SiR$^1$$_2$O$_{2/2}$];
    T=[SiR$^1$O$_{3/2}$];
    Q=[SiO$_{4/2}$];
    a=2-10;
    b=5-150;
    c=0-10;
    d=0-10; and
    R$^1$=identical or different radicals from the group: alkyl radicals having 1-30 carbon atoms, aryl radicals having 6-30 carbon atoms, alkaryl radicals having 7-30 carbon atoms;
wherein the formula II is represented by:

$$R^1{}_e(R^2O)_f SiR^3 \qquad \text{Formula II;}$$

where:
    e=0, 1 or 2;
    f=1, 2 or 3;
        with the proviso that e+f=3;
    R$^2$=identical or different alkyl radicals having 1-30 carbon atoms or aryl radicals having 6-30 carbon atoms or alkaryl radicals having 7-30 carbon atoms; and
    R$^3$=identical or different organic radicals which carry at least one amino function;
wherein one or more trialkylalkoxysilanes of the formula VI or bis(trialkylsilyl)amines of the general formula VII are reacted as further reaction component in the presence of carboxylic acid anhydrides at temperatures of 40-180° C.;
wherein the formula VI is represented by:

$$R^9{}_3Si(OR^2) \qquad \text{Formula VI;}$$

and
wherein the formula VII is represented by:

$$(R^9{}_3Si)_2NR^5 \qquad \text{Formula VII;}$$

where:
    R$^5$=an alkyl radical having 1-12 carbon atoms, or an aryl radical having 6-12 carbon atoms, or an alkaryl radical having 7-12 carbon atoms, or H; and
    R$^9$=identical or different alkyl radicals having 1 to 30 carbon atoms.

2. The process for the preparation of amine-amide-functional siloxanes according to claim 1;
wherein R$^3$ in formula II is a radical of the general formula III:

$$\text{—}(CR^4{}_2)_g[NR^5\text{—}(CR^4{}_2)_i]_h NR^5{}_2 \qquad \text{Formula III}$$

where:
    g=identical or different integers from 1-6;
    h=identical or different integers from 0-6;
    i=identical or different integers from 1-6;

R⁴=identical or different alkyl radicals having 1-12 carbon atoms, or aryl radicals having 6-12 carbon atoms or alkaryl radicals having 7-12 carbon atoms or H; and R⁵=identical or different alkyl radicals having 1-12 carbon atoms, or aryl radicals having 6-12 carbon atoms or alkaryl radicals having 7-12 carbon atoms or H.

3. The process for the preparation of amine-amide-functional siloxanes according to claim 1;
where the following apply:
c=0;
d=0; and
a=2.

4. The process for the preparation of amine-amide-functional siloxanes according to claim 1;
where $R^1$=Me.

5. The process for the preparation of amine-amide-functional siloxanes according to claim 1;
where the following apply:
$R^4$=H;
$R^5$=H;
h=0; and
g=1-5.

6. The process for the preparation of amine-amide-functional siloxanes according to Claim 1;
where the following apply:
$R^4$=H;
$R^5$=H;
h=1 or 2;
g=1-5; and
i=1-5.

7. The process for the preparation of amine-amide-functional siloxanes according to claim 1;
wherein the amino-functional silanes of the formula II are selected from the group consisting of:
(EtO)₃Si(CH₂)₃NH₂, (MeO)₃Si(CH₂)₃NH₂, Me(EtO)₂Si(CH₂)₃NH₂, Me(MeO)₂Si(CH₂)₃NH₂, (EtO)₃Si(CH₂)₃NH(CH₂)₂NH₂, (MeO)₃Si(CH₂)₃NH(CH₂)₂NH₂, Me(EtO)₂Si(CH₂)₃NH(CH₂)₂NH₂, Me(MeO)₂Si(CH₂)₃NH(HCH)₂NH₂, (EtO)₃SiCH₂NH₂, and (MeO)₃SiCH₂NH₂.

8. The process for the preparation of amine-amide-functional siloxanes according to claim 1;
wherein the carboxylic acid anhydrides are selected from the group consisting of:
anhydrides of linear or branched, saturated or unsaturated alkylcarboxylic acids, acetic anhydride, propionic anhydride, butyric anhydride or isononanoic anhydride, succinic anhydride, itaconic anhydrides, maleic anhydride, glutaric anhydride, phthalic anhydride, and hexahydrophthalic anhydride.

9. The process for the preparation of amine-amide-functional siloxanes, more than half of the chain ends of which are no longer capable of condensation, according to claim 1;
wherein one or more bis(trialkylsilyl)amines are added as further reaction component.

10. The process for the preparation of amine-amide-functional siloxanes according to claim 1;
wherein one or more polyfunctional alcohols are added as further reaction component.

11. The process for the preparation of amine-amide-functional siloxanes according to Claim 1;
wherein the reaction is carried out at least at times at pressures of below 500 mbar.

12. The process for the preparation of amine-amide-functional siloxanes according to claim 1;
wherein the quantitative ratio between amino-functional silane and carboxylic acid anhydride is from 1/0.9 to 1/0.02.

13. A composition obtained by the process of claim 1, containing:
amide-amine-siloxanes of the general formula IV:

$$M^{OR}_j M_k D_l T_m Q_n M'_o D'_p T'_q \quad \text{Formula IV;}$$

where:
$M^{OR}$=[R⁶OSiR¹₂O₁/₂];
M=[R¹₃SiO₁/₂];
D=[SiR¹₂O₂/₂];
T=[SiR¹O₃/₂];
Q=[SiO₄/₂];
M'=[R⁷SiR¹₂O₁/₂];
D'=[SiR¹R⁷O₂/₂];
T'=[SiR⁷O₃/₂];
$R^1$=identical or different radicals from the group: alkyl radicals having 1-30 carbon atoms, aryl radicals having 6-30 carbon atoms, alkaryl radicals having 7-30 carbon atoms;
$R^6$=$R^2$ or H;
$R^2$=identical or different alkyl radicals having 1-30 carbon atoms or aryl radicals having 6-30 carbon atoms or alkaryl radicals having 7-30 carbon atoms; and
$R^7$=identical or different organic radicals;
with the proviso that each molecule of the formula IV carries, in statistical terms, at least one amine radical of the general formula III and moreover at least one amide radical of the general formula V;
wherein the formula III is represented by:

$$-(CR^4_2)_g[NR^5-(CR^4_2)_i]_h NR^5_2 \quad \text{Formula III;}$$

and
wherein the formula V is represented by:

$$-(CR^5_2)_g[NR^8-(CR^5_2)_i]_h NR^8_2 \quad \text{Formula V;}$$

where:
g=identical or different integers from 1-6;
h=identical or different integers from 0-6;
i=identical or different integers from 1-6;
$R^4$=identical or different alkyl radicals having 1-12 carbon atoms, or aryl radicals having 6-12 carbon atoms or alkaryl radicals having 7-12 carbon atoms or H;
$R^5$=identical or different alkyl radicals having 1-12 carbon atoms, or aryl radicals having 6-12 carbon atoms or alkaryl radicals having 7-12 carbon atoms or H; and
$R^8$=$R^5$, or a carboxylic acid- or carboxylate-containing group, with the proviso that at least one of the two $R^8$ radicals in the formula V is a carboxylic acid- or carboxylate-containing group;
where:
j=0-10; and
k=0-10;
with the proviso that j+k is greater than or equal to 2;
where:
l=10-3000;
m=0-20;
n=0-20; and
o=0-10; and
where:
p=0-20; and
q=0-20;
with the proviso that o+p is greater than or equal to 2.

14. The composition of claim 13;
where the following apply:
  in =0;
  n=0; and
  j+k=2.

15. The process of Claim 2;
wherein:
  c=0, d=0, a=2;
  $R^1$=Me;
  $R^4$=H;
  $R^5$=H; and
  h=0, g=1-5;
wherein the amino-functional silanes of the formula II are selected from the group consisting of:
  $(EtO)_3O)_3SH)_3NH_2$, $(MeO)_3Si(CH_2)_3NH_2$, $Me(EtO)_2Si(CH_2)_3NH_2$, $Me(MeO)_2Si(CH_2)_3NH_2$, $(EtO)_3Si(CH_2)_3NH(CH_2)_2NH_2$, $(MeO)_3Si(CH_2)_3NH(CH_2)_2NH_2$, $Me(EtO)_2Si(CH_2)_3NH(CH_2)_2NH_2$, $Me(MeO)_2Si(CH_2)_3NH(CH_2)_2NH_2$, $(EtO)_3SiCH_2NH_2$, and $(MeO)_3SiCH_2NH_2$; and
wherein the carboxylic acid anhydrides are selected from the group consisting of:
  anhydrides of linear or branched, saturated or unsaturated alkylcarboxylic acids, acetic anhydride, propionic anhydride, butyric anhydride or isononanoic anhydride, succinic anhydride, itaconic anhydrides, maleic anhydride, glutaric anhydride, phthalic anhydride, and hexahydrophthalic anhydride.

16. The process of Claim 2;
wherein:
  c=0, d=0, a=2;
  $R^1$=Me;
  $R^4$=H;
  $R^5$=H; and
  h=1 or 2, g=1-5, i=1-5;
wherein the amino-functional silanes of the formula II are selected from the group consisting of:
  $(EtO)_3Si(CH_2)_3NH_2$, $(MeO)_3Si(CH_2)_3NH_2$, $Me(EtO)_2Si(CH_2)_3NH_2$, $Me(MeO)_2Si(CH_2)_3NH_2$, $(EtO)_3Si(CH_2)_3NH(CH_2)_2NH_2$, $(MeO)_3Si(CH_2)_3NH(CH_2)_2NH_2$, $Me(EtO)_2Si(CH_2)_3NH(CH_2)_2NH_2$, $Me(MeO)_2Si(CH_2)_3NH(CH_2)_2NH_2$, $(EtO)_3SiCH_2NH_2$, and $(MeO)_3SiCH_2NH_2$; and
wherein the carboxylic acid anhydrides are selected from the group consisting of:
  anhydrides of linear or branched, saturated or unsaturated alkylcarboxylic acids, acetic anhydride, propionic anhydride, butyric anhydride or isononanoic anhydride, succinic anhydride, itaconic anhydrides, maleic anhydride, glutaric anhydride, phthalic anhydride, and hexahydrophthalic anhydride.

* * * * *